United States Patent
Wang

(10) Patent No.: US 12,434,446 B2
(45) Date of Patent: Oct. 7, 2025

(54) FOLDABLE FRP PLATE AND MANUFACTURING METHOD THEREOF

(71) Applicant: TIANJIN UNIVERSITY, Tianjin (CN)

(72) Inventor: Lichen Wang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/902,636

(22) Filed: Sep. 2, 2022

(65) Prior Publication Data
US 2023/0226778 A1 Jul. 20, 2023

(30) Foreign Application Priority Data
Jan. 18, 2022 (CN) .......................... 202210055398.3

(51) Int. Cl.
| | |
|---|---|
| B29C 70/22 | (2006.01) |
| B05D 1/32 | (2006.01) |
| B29C 53/00 | (2006.01) |
| B29C 53/04 | (2006.01) |
| B29C 70/34 | (2006.01) |
| B29K 277/00 | (2006.01) |

(Continued)

(52) U.S. Cl.
CPC ............. B29C 70/22 (2013.01); B05D 1/32 (2013.01); B29C 53/005 (2013.01); B29C 53/04 (2013.01); B29C 70/34 (2013.01); B31D 5/04 (2013.01); C08J 5/24 (2013.01); B29K 2277/10 (2013.01); B29K 2307/04 (2013.01); B29K 2309/08 (2013.01); B29K 2309/14 (2013.01); B29K 2313/00 (2013.01); B29L 2031/10 (2013.01); C08J 2363/00 (2013.01); E04H 9/021 (2013.01)

(58) Field of Classification Search
CPC ....... B29C 53/06; B29C 53/005; B29C 53/04; B05D 1/32–327; B31D 5/04
See application file for complete search history.

(56) References Cited

U.S. PATENT DOCUMENTS

| | | | | |
|---|---|---|---|---|
| 2011/0177279 A1* | 7/2011 | Casteras | ................ | B64G 1/222 |
| | | | | 428/53 |
| 2014/0272245 A1* | 9/2014 | Livingston-Peters | ........................ | |
| | | | | B29C 53/06 |
| | | | | 428/58 |
| 2019/0315045 A1* | 10/2019 | Choma | ................. | B29C 59/007 |

FOREIGN PATENT DOCUMENTS

| | | |
|---|---|---|
| CN | 109235177 A | 1/2019 |
| JP | 3125490 U *| 9/2006 |
| JP | 2019214915 A *| 12/2019 |

OTHER PUBLICATIONS

Partial machine translation of JP-2019214915-A.*
Partial machine translation of JP 3125490 U (Year: 2006).*
Partial machine translation of JP 2019-214915 A (Year: 2019).*

* cited by examiner

Primary Examiner — Kregg T Brooks

(57) ABSTRACT

The present invention discloses a foldable FRP plate, comprising a plurality of first regions and one or a plurality of second regions which are integrated in one piece; the second region is located between two adjacent first regions, so that the adjacent first regions being folded and unfolded relative to each other with the second region as a rotating shaft; the first regions are plate-like products manufactured by impregnating fiber woven fabric with resin for curing, are rigid and cannot be folded; the second region is flexible fiber woven fabric and has a width being two times a design thickness of the FRP plate. The present invention also discloses a manufacturing method, including laying the fiber woven fabric according to a design thickness and a layer layout; dividing the first regions and the second region according to an origami design method.

3 Claims, 3 Drawing Sheets

(51) Int. Cl.
*B29K 307/04* (2006.01)
*B29K 309/00* (2006.01)
*B29K 309/08* (2006.01)
*B29L 31/10* (2006.01)
*B31D 5/04* (2017.01)
*C08J 5/24* (2006.01)
*E04H 9/02* (2006.01)

FOLDABLE FRP PLATE AND MANUFACTURING METHOD THEREOF

CROSS-REFERENCE TO RELATED APPLICATION

This application claims priority from the Chinese patent application 2022100553983 filed Jan. 18, 2022, the content of which is incorporated herein in the entirety by reference.

TECHNICAL FIELD OF THE DISCLOSURE

The present disclosure relates to the field of civil engineering, in particular to a foldable FRP (Fiber Reinforced Polymer) plate and a manufacturing method thereof.

BACKGROUND ART

A deployable structure based on origami theory is widely applied to the field of aerospace structures, engineering protection structures, soft robots and the like. A fiber reinforced polymer plate (short for "composite plate" or FRP plate) has the excellent properties of light weight, high strength, corrosion resistance, low relaxation property, fatigue resistance, small coefficient of linear expansion and the like, but cannot be subjected to welding. When adopting hinge connection, adhesive connection and the like, a region with poor local stress can be generated in the FRP plate, and thus hindering the practical application of the FRP plate in the deployable structure.

SUMMARY OF THE DISCLOSURE

The objective of the present disclosure is to overcome the defects in the prior art and provide a foldable FRP (Fiber Reinforced Polymer) plate. The FRP plate of the present disclosure is of an integrated structure and a simple structure, can be folded according to an origami design solution and is applied to a deployable structure.

The purpose of the present disclosure is implemented by the following technical solution.

The foldable FRP plate comprises a plurality of first regions and one or a plurality of second regions second region which are integrated in one piece; wherein the second region is located between two adjacent first regions, so that the adjacent first regions can be folded and unfolded relative to each other with the second region as a rotating shaft;

wherein the first regions are plate-like products manufactured by impregnating fiber woven fabric with resin for curing, are rigid and cannot be folded;

the second region is flexible fiber woven fabric and has a width being two times a design thickness of the FRP plate.

Further, the fiber woven fabric is selected from any one of the groups consisting of: carbon fiber fabric, glass fiber fabric, aramid fiber fabric and a basalt fiber reinforced polymer.

Further, when a designed folding angle formed between the two adjacent first regions by folding is $150°<\alpha\leq180°$, the fiber woven fabric is selected from unidirectional fiber woven fabric; when the designed folding angle is $90°<\alpha\leq150°$, the fiber woven fabric is selected from bidirectional fiber woven fabric; and when the designed folding angle is $0°<\alpha\leq90°$, the fiber woven fabric is selected from multidirectional fiber woven fabric.

Further, when a designed folding structure bears a unidirectional design load, the bidirectional fiber fabric is adopted; and when the foldable structure bears a bidirectional or three-way design load, multidirectional fiber fabric is adopted.

Further, the first regions and the second region are respectively in a polygonal shape which is selected from one of the groups consisting of: a square, a rectangle, a parallelogram and a triangle.

A manufacturing method for the foldable FRP plate comprises the following steps:

laying the fiber woven fabric according to a design thickness and a layer layout;

dividing the first regions and the second region according to an origami design method, and setting sizes of a plurality of first regions and the second region(s) according to a design layout, wherein a width of the second region is equal to two times of a design thickness of the plate; and impregnating fiber woven fabric of each first region with resin for curing, not impregnating fiber woven fabric of the second region with the resin, and completing manufacturing of the foldable FRP plate after the resin being cured and formed. The first regions of the manufactured FRP plate cannot be folded, and the second region is foldable.

Compared with the prior art, the technical solution of the present disclosure has the following beneficial effects.

With the rigid first regions as flat plates and the adjacent flexible second region as a rotating shaft, the foldable FRP plate of the present disclosure achieves an FRP plate structure which can be folded or unfolded, so as to reduce the complexity of folding and unfolding of the structure.

Moreover, the foldable FRP plate is of an integrated structure, which is foldable according to an origami design solution, is applied to a deployable structure; the present disclosure promotes application of a high-performance fiber reinforced composite material in the deployable structure, is more reliable compared with an existing structure and is reusable.

Figure 1:
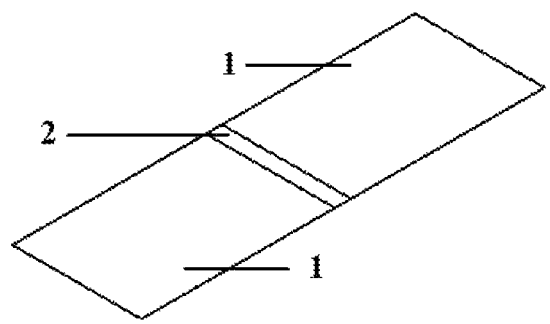
FIG. 1 is a flat layout diagram of a foldable FRP plate basic-unit structure according to embodiment 1.

In the drawings:
1: first region
2: second region
101, 102, 103, 104, 105, 106: first region
201, 202, 203, 204, 205, 206: second region

DETAILED DESCRIPTION OF THE DISCLOSURE

In order to make the purposes, the technical solutions, the beneficial effects and the impressive progresses of the embodiments of the present disclosure clearer, the technical solutions of the embodiments of the present disclosure will be clearly and completely described below in conjunction with accompanying drawings provided in examples of the present disclosure. Obviously, these described embodiments are partial embodiments of the present disclosure only but not all the embodiments. Based on the embodiments of the present disclosure, all the other embodiments obtained by those of ordinary skill in the art without any creative works are within the protection scope of the present disclosure.

Embodiment 1

As shown in FIG. 1, a foldable FRP plate basic-unit structure comprises two first regions 1 and a second region 2 which are integrated in one piece. In a flat layout state, the second region 2 is arranged between the two adjacent first regions 1, so that the adjacent two first regions 1 can be folded and unfolded relative to each other with the second region 2 as a rotating shaft, so as to reduce the complexity of folding and unfolding of such structure. A plurality of the basic units of the foldable FRP plate may be formed into a complex FRP plate folding mode based on an origami design method through combination.

A manufacturing method for the basic units of the foldable FRP plate comprises the steps of:

soft and foldable multidirectional fiber fabric is laid according to a design thickness and a layer layout, wherein when a designed folding angle is $150°<\alpha\leq180°$ (wherein the folding angle $\alpha$ is an included angle formed between the two first regions by folding), it is suggested to use unidirectional fiber fabric; when the designed folding angle is $90°<\alpha\leq150°$, it is suggested to use bidirectional fiber fabric; and when the designed folding angle is $0°<\alpha\leq90°$, it is suggested to use multidirectional fiber fabric. The first regions 1 and the second region 2 are divided according to an origami design method, wherein two equal first regions 1 are divided, and sizes of the first regions and a size of the second region according to the design layout are set, wherein a width of the second region 2 is equal to two times of a design thickness of the plate.

The fiber woven fabric of each first region with resin is impregnated for curing, and fiber woven fabric of the second region is not impregnated with the resin, and manufacture of the foldable FRP plate after the resin being cured and formed is completed.

After curing, each first region is thicker than the second region by smaller than 1 mm, so that a thickness difference between the two regions is ignored. The design thickness of the plate described herein refers to design thicknesses of the first regions and the second region.

Figure 2:
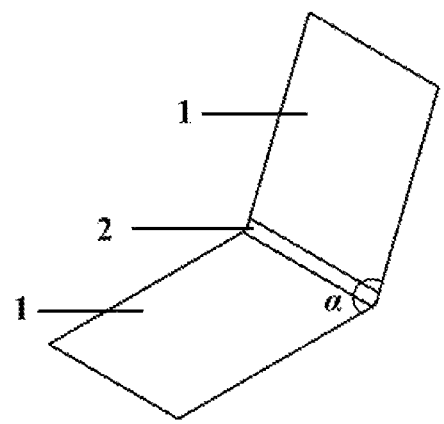
FIG. 2 is a folded layout diagram of the foldable FRP plate basic-unit structure according to embodiment 1.

A folded state of the foldable FRP plate basic-unit structure is shown in FIG. 2.

Manufacturing Requirements:

1. The high-performance fiber woven fabric is selected according to a design layout and may be selected from carbon fiber fabric, glass fiber fabric, aramid fiber fabric or a basalt fiber reinforced polymer.

2. The resin is selected from epoxy resin, and a glass-transition temperature of the epoxy resin is larger than or equal to 60° C. and should be higher than a maximum average temperature in a structural environment by 10° C. or above.

Embodiment 2

Figure 3:
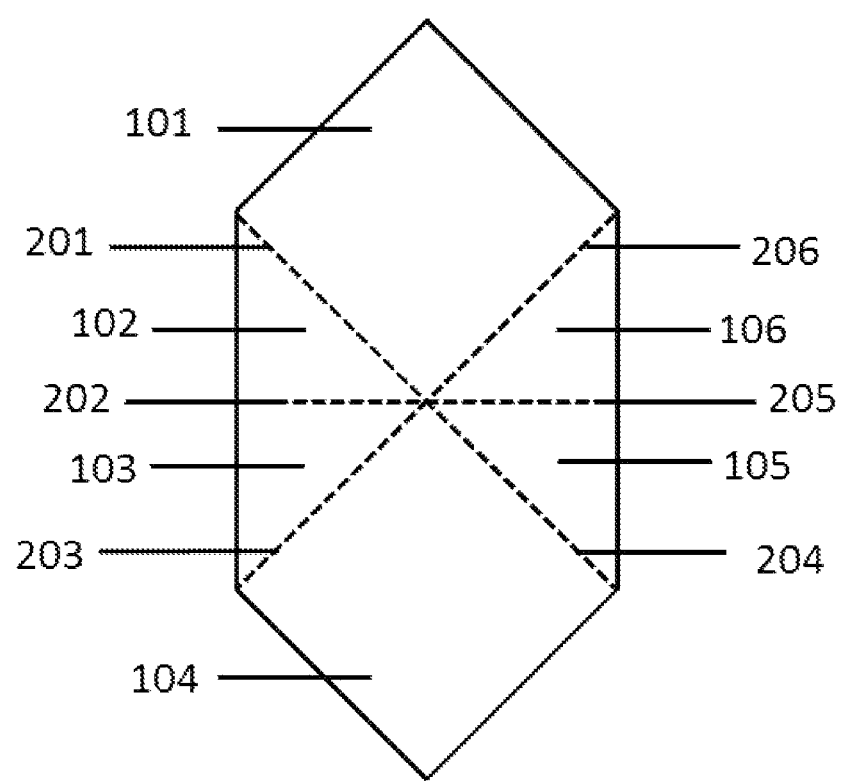
FIG. 3 is a flat layout diagram of a foldable FRP plate multi-unit structure according to embodiment 2.
Figure 4:
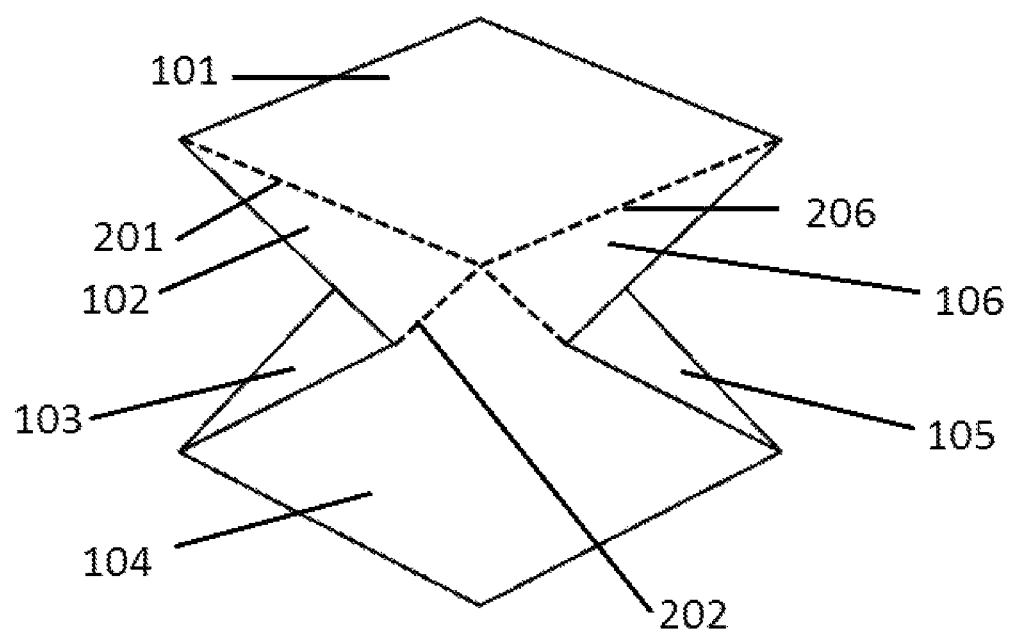
FIG. 4 is a folded layout diagram of the foldable FRP plate multi-unit structure according to embodiment 2.

Embodiment 2 discloses an FRP plate multi-unit structure designed by embodiment 1 by combination on the basis of the basic-unit in embodiment 1. The same contents as embodiment 1 will not be described, and only the distinguishing characteristics will be described below. As shown in FIG. 3, a foldable FRP plate multi-unit structure comprises six first regions 101, 102, 103, 104, 105, 106 and six second regions 201, 202, 203, 204, 205, 206 which are integrated as a whole, wherein the second regions are represented by dotted lines. In this embodiment, the second region between every two adjacent first regions is taken as a second region for description, and six second regions are included in this embodiment. Alternatively, a linear penetrating region can be taken as the second region for description, so that three second regions exist in the structure shown in FIG. 3, namely, the second region 201 and the second region 204 are considered as one second region, the second region 203 and the second region 206 are considered as one second region, and the second region 202 and the second region 205 are considered as one second region. A folded state of the foldable FRP plate is shown in FIG. 4, and the foldable FRP plate may be used as a dissipative member in a building structure for improving the anti-seismic property of the building structure.

A manufacturing method for the foldable FRP plate multi-unit structure comprises the steps of: soft and foldable fiber woven fabric is laid according to a design thickness and a layer layout, wherein when a folding structure bears a unidirectional design load, bidirectional fiber fabric is used; and when the foldable structure bears a bidirectional or three-way design load, multidirectional fiber fabric is used. The first regions 1 and the second regions 2 are divided according to an origami design method, and sizes of the first regions and the second regions according to a design layout are set, wherein a width of the second region 2 is equal to two times of a thickness of the plate.

The fiber woven fabric of each first region 1 is impregnated with resin for curing, and the fiber woven fabric of the second region 2 is not impregnated with the resin, and manufacture of the foldable FRP plate is completed after the resin being cured and formed.

The above embodiments are only used to explain the technical solution of the present disclosure and shall not be construed as limitation. Although the present disclosure has been described in detail with respect to the previously described embodiments, it should be appreciated by those skill in art, the technical solutions recorded in the embodiments may be still modified, or part of or all its technical features may be replaced with equivalents; and such modifications or substitutions do not deviate the nature of the technical solutions from the scope of the technical solutions of the various embodiments in the present disclosure. Non-essential improvements and adjustments or substitutions made by those skill in art according to the contents of this specification all fall in the protection scope of the present disclosure.

What is claimed is:

1. A foldable FRP plate, wherein
the FRP plate divides fiber woven fabric into six first regions (101), (102), (103), (104), (105) and (106) and six second region (201), (202), (203), (204), (205) and (206) according to an origami design method;
the fiber woven fabric of each of the first regions (101), (102), (103), (104), (105) and (106) is impregnated with resin for curing, and fiber woven fabric of each of the second regions (201), (202), (203), (204), (205) and (206) is not impregnated with resin and manufacture of the foldable FRP plate after the resin being cured and formed is completed; after curing, each of the first regions is thicker than each of the second regions by smaller than 1 mm, so that a thickness difference between the first regions and the second regions is ignored;
the second region (201) is located between two adjacent the first region (101) and the first region (102);

the second region (202) is located between two adjacent the first region (102) and the first region (103);

the second region (203) is located between two adjacent the first region (103) and the first region (104);

the second region (204) is located between two adjacent the first region (104) and the first region (105);

the second region (205) is located between two adjacent the first region (105) and the first region (106);

the second region (206) is located between two adjacent the first region (106) and the first region (101);

so that the adjacent first regions (101), (102), (103), (104), (105) and (106) being folded and unfolded relative to each other with the each of the second regions (201), (202), (203), (204), (205) and (206) as a rotating shaft;

wherein the each of the first regions (101), (102), (103), (104), (105) and (106) is rigid and cannot be folded;

the each of the second regions (201), (202), (203), (204), (205) and (206) is flexible fiber woven fabric and has a width being two times a design thickness of the FRP plate;

wherein when a designed folding angle formed between the two adjacent first regions (101), (102), (103), (104), (105) and (106) by folding is $150°<\alpha\leq180°$, the fiber woven fabric is selected from unidirectional fiber woven fabric; and when the designed folding angle is $90°<\alpha\leq150°$, the fiber woven fabric is selected from bidirectional fiber woven fabric; and when the designed folding angle is $0°<\alpha\leq90°$, the fiber woven fabric is selected from multidirectional fiber woven fabric;

wherein the each of the first regions (101), (102), (103), (104), (105) and (106) and the second regions (201), (202), (203), (204), (205) and (206) is respectively in a polygonal shape which is one selected from a group consisting of a square, a rectangle, a parallelogram and a triangle;

wherein the first regions (101), and (104) is the square; and wherein each of the first regions (102), (103), (105) and (106) are triangles.

2. The foldable FRP plate according to claim 1, wherein the fiber woven fabric is selected from any one of a group consisting of: carbon fiber fabric, glass fiber fabric, aramid fiber fabric and a basalt fiber reinforced polymer.

3. A manufacturing method for the foldable FRP plate according to claim 1, comprising the steps of:

laying the fiber woven fabric according to a design thickness and a layer layout; dividing the fiber woven fabric into first regions (101), (102), (103), (104), (105) and (106) and the second region (201), (202), (203), (204), (205) and (206) according to an origami design method, and setting sizes of a plurality of first regions (101), (102), (103), (104), (105) and (106) and the second region(s) (201), (202), (203), (204), (205) and (206) according to a design layout, wherein a width of the second region (201), (202), (203), (204), (205) and (206) is equal to two times of a design thickness of the plate; and impregnating fiber woven fabric of each first region (101), (102), (103), (104), (105) and (106) with resin for curing, not impregnating fiber woven fabric of the second region(s) (201), (202), (203), (204), (205) and (206) with the resin, and completing manufacturing of the foldable FRP plate after the resin being cured and formed.

\* \* \* \* \*